(12) United States Patent
Odaohhara

(10) Patent No.: US 6,346,794 B1
(45) Date of Patent: Feb. 12, 2002

(54) METHOD OF CONTROLLING CHARGE AND DISCHARGE OF A PLURALITY OF BATTERIES

(75) Inventor: Shigefumi Odaohhara, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/591,285

(22) Filed: Jun. 9, 2000

(30) Foreign Application Priority Data

Jun. 8, 1999 (JP) ............................................ 11-161634

(51) Int. Cl.⁷ ................................................ H02J 7/00
(52) U.S. Cl. ........................................................ 320/116
(58) Field of Search ................................ 370/116, 117, 370/128; 307/64, 66

(56) References Cited

U.S. PATENT DOCUMENTS

| 5,532,524 | A | * | 7/1996 | Townsley et al. | 307/64 |
| 5,666,006 | A | * | 9/1997 | Townsley et al. | 307/66 |
| 6,204,633 | B1 | * | 8/1998 | Kitagawa | 320/128 |
| 5,808,444 | A | * | 9/1998 | Saeki et al. | 320/117 |
| 6,160,377 | A | * | 10/1998 | Fujii | 320/117 |
| 5,869,950 | A | * | 2/1999 | Hoffman, Jr. et al. | 320/116 |
| 6,023,149 | A | * | 2/1999 | Pizzi | 320/128 |

* cited by examiner

Primary Examiner—Peter S. Wong
Assistant Examiner—Pia Tibbits
(74) Attorney, Agent, or Firm—J. Bruce Schelkopf; Bracewell & Patterson, LLP

(57) ABSTRACT

Disclosed is a method for controlling efficient charge and discharge of a plurality of batteries. At the beginning of the discharge cycle, parallel discharge of the rechargeable batteries is performed until the batteries discharge to a predetermined percentage of total capacity. Following, serial discharge is performed with the secondary battery being fully discharged before the primary battery is discharged. Thus, the rechargeable batteries respectively are each at least partially discharged at start of charging. When charging commences, the rechargeable batteries are first charged serially until predetermined percentages of capacity are realized. The serial charging is performed with full constant current. Following, the batteries are charged in parallel utilizing a constant voltage whereby the current decreases as the respective capacities approach 100%. As a result, the plurality of batteries are charged more efficiently and in a shorter time than if charge individually or serially.

26 Claims, 7 Drawing Sheets

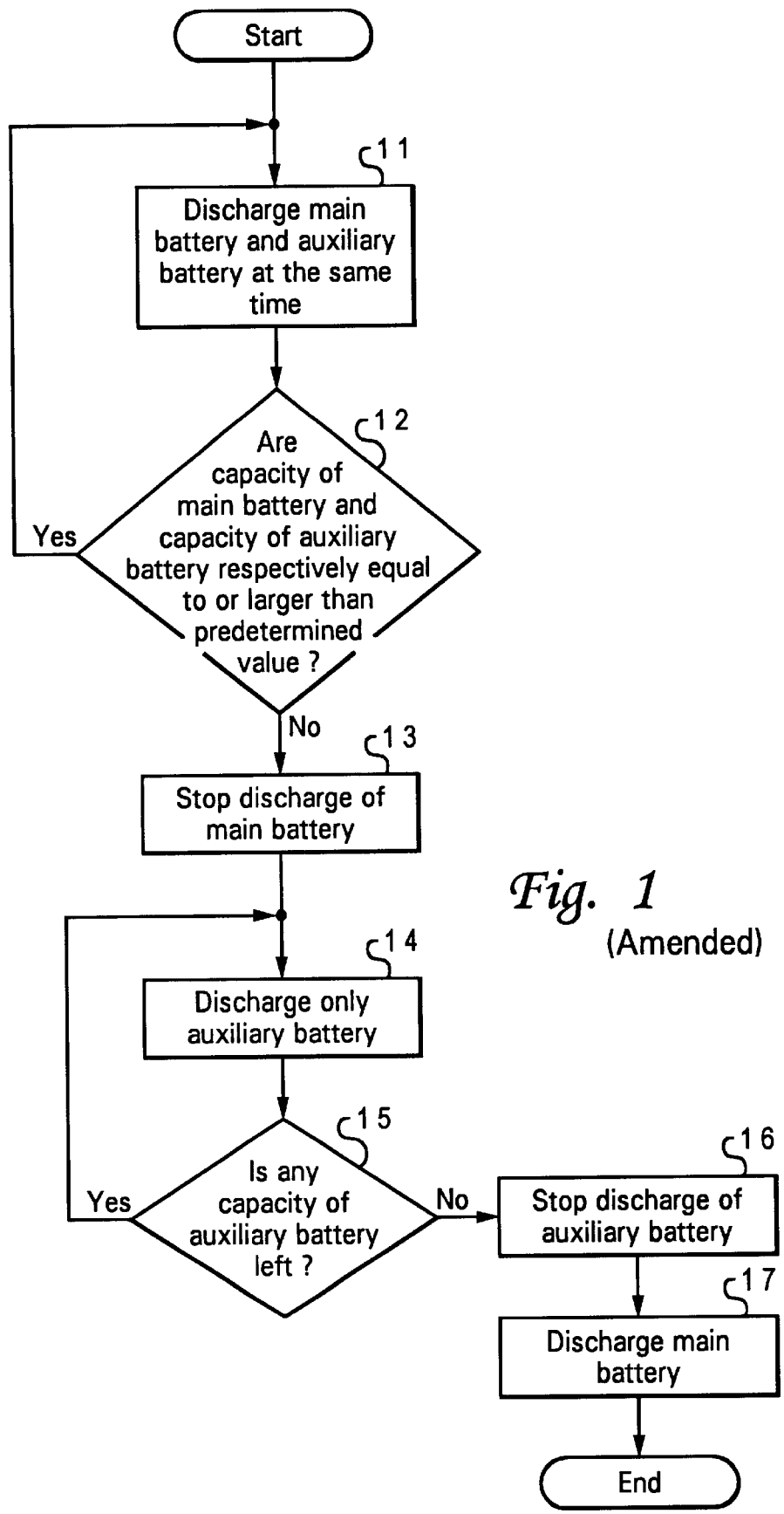
Fig. 1
(Amended)

METHOD OF CONTROLLING CHARGE AND DISCHARGE OF A PLURALITY OF BATTERIES

BACKGROUND OF THE INVENTION

1. Technical Field

The present invention relates in general to rechargeable batteries and, in particular to a method of controlling charge and discharge of a pair of rechargeable batteries utilized as individual power supplies in an electronic apparatus.

2. Description of the Related Art

Because of increase in demand for mobile computing, portable personal computers including notebook-type personal computers (PC), subnotebook-type PCs, palm-top-type PCs, and Personal Data Assistants (PDA)(hereafter collectively referred to as portable PCs) have been developed.

A typical portable PC has a built-in battery, which allows the user to use the portable PC in an environment, such as the inside of a train, in which a commercial power supply cannot be used. The built-in battery is typically a rechargeable battery that can be repeatedly discharged and charged.

In an environment in which a commercial power supply is available, a user connects an AC adapter (i.e., unit for receiving commercial alternating current (AC) and converting it to direct current (DC) for use by a portable PC). Use of the AC adapter makes it possible to charge a rechargeable battery of the portable PC while the portable PC is being powered by the converted DC current.

A rechargeable battery has limited capacity and therefore is only able to power a portable PC for a limited time. To increase the battery powering time for portable-PC, portable PCs are often equipped with two rechargeable batteries, which may be built in. These two rechargeable batteries are referred to as a main battery and an auxiliary battery. The portable PC initially operates by using the auxiliary battery as a power supply. Then, when the capacity of the auxiliary battery is exhausted, the portable PC switches from the auxiliary battery to the main battery to continue powering.

Typically, a charger is capable of charging only one rechargeable battery at a time (i.e., the charger generates only enough charge to fulfill the capacity requirements of a single battery). Therefore, to charge both the main and auxiliary rechargeable batteries, the main battery is first charged followed sequentially by the auxiliary battery. However, because the two batteries are charged in sequence, the time required to charge both batteries is the sum of the two individual times. If both batteries have similar capacity, then the time to charge both batteries is double the time to charge one battery.

Japanese Published Unexamined Patent Application No. 9-103033 discloses a method by which a main battery up to the 50% capacity by one charging circuit, then charges an auxiliary battery up to the 50% capacity, and thereafter connects the main battery and the auxiliary battery in parallel to charge both batteries at the same time, thereby decreasing the charging time.

As described above, the portable PC uses a main battery after completely discharging the auxiliary battery. The effect decreases as a main battery is used less. When a main battery is not used, however, the method fails to show the effect. Normally, when a portable PC is used, the auxiliary battery is not frequently completely discharged because charging is performed early. Therefore, the main battery is rarely used. The method disclosed in the above application is thus not always effective at the time of considering an actual operating state of a main battery or auxiliary battery. Thus, the problem of decreasing the time for charging a plurality of rechargeable batteries still remains unsolved. The present invention recognizes and solves the above problem.

SUMMARY OF THE INVENTION

It is an object of the present invention to provide a method of controlling charge and discharge of a plurality of batteries, by which the plurality of batteries may be efficiently charged in a short time.

The foregoing object is achieved as follows. Disclosed is a method for controlling efficient charge and discharge of a plurality of batteries. At the beginning of the discharge cycle, parallel discharge of the rechargeable batteries is performed until the batteries discharge to a predetermined percentage of total capacity. Thereafter, the batteries are discharged serially with the secondary battery being fully discharged before the primary battery is discharged. Thus, the rechargeable batteries each have are at least partially discharged at the start of charging. When charging commences, a serial charge of the rechargeable batteries is first completed until predetermined percentages of capacity are realized. The serial charging is completed with full constant current. Following, the batteries are charged in parallel utilizing a constant voltage such that the current decreases as the charges approach 100%. As a result, the plurality of batteries are charged more efficiently and in a shorter time than if charge individually or serially.

In addition, a method is disclosed of controlling charge and discharge of a plurality of rechargeable batteries in an environment where the battery charger does not provide sufficient capacity to parallel-charge the rechargeable batteries. When a rechargeable battery is being charged from a completely discharged state up to a fully charged state, the charging efficiency (that is, the charging current over the charging cycle) is high at the beginning of the charging cycle and gradually decreases when approaching the end of the charging cycle. The charging current also decreases as the charging time passes and subsequently the margin of the charger increases. Based on these characteristics and other factors, the invention switches from sequential to parallel charging. The present invention makes it possible to control a discharging and recharging sequence of a plurality of rechargeable batteries.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a flow chart which illustrates the discharge processing according to an embodiment of the present invention;

DESCRIPTION OF THE PREFERRED EMBODIMENT

The present invention provides a method of controlling charge and discharge of a plurality of batteries coupled to an electronic device. To simplify the description of the invention, all embodiments will be presented with two rechargeable batteries. The first battery is hereafter referred to as a main battery and the other battery is referred to as an auxiliary battery. For illustrative purposes, the invention is presented within the context of a portable PC, which is powered by the main and auxiliary batteries during operation.

Japanese Published Unexamined Patent Application No. 9-103033 discloses a method by which a main battery up to the 50% capacity by one charging circuit, then an auxiliary battery is charged up to the 50% capacity, and thereafter the main battery and the auxiliary battery are connected in parallel to charge both batteries at the same time, thereby decreasing the charging time. However, the method of the above Published Unexamined Patent Application No. 9-103033, only provides the maximum effect when a main battery is also completely discharged.

Figure 2:
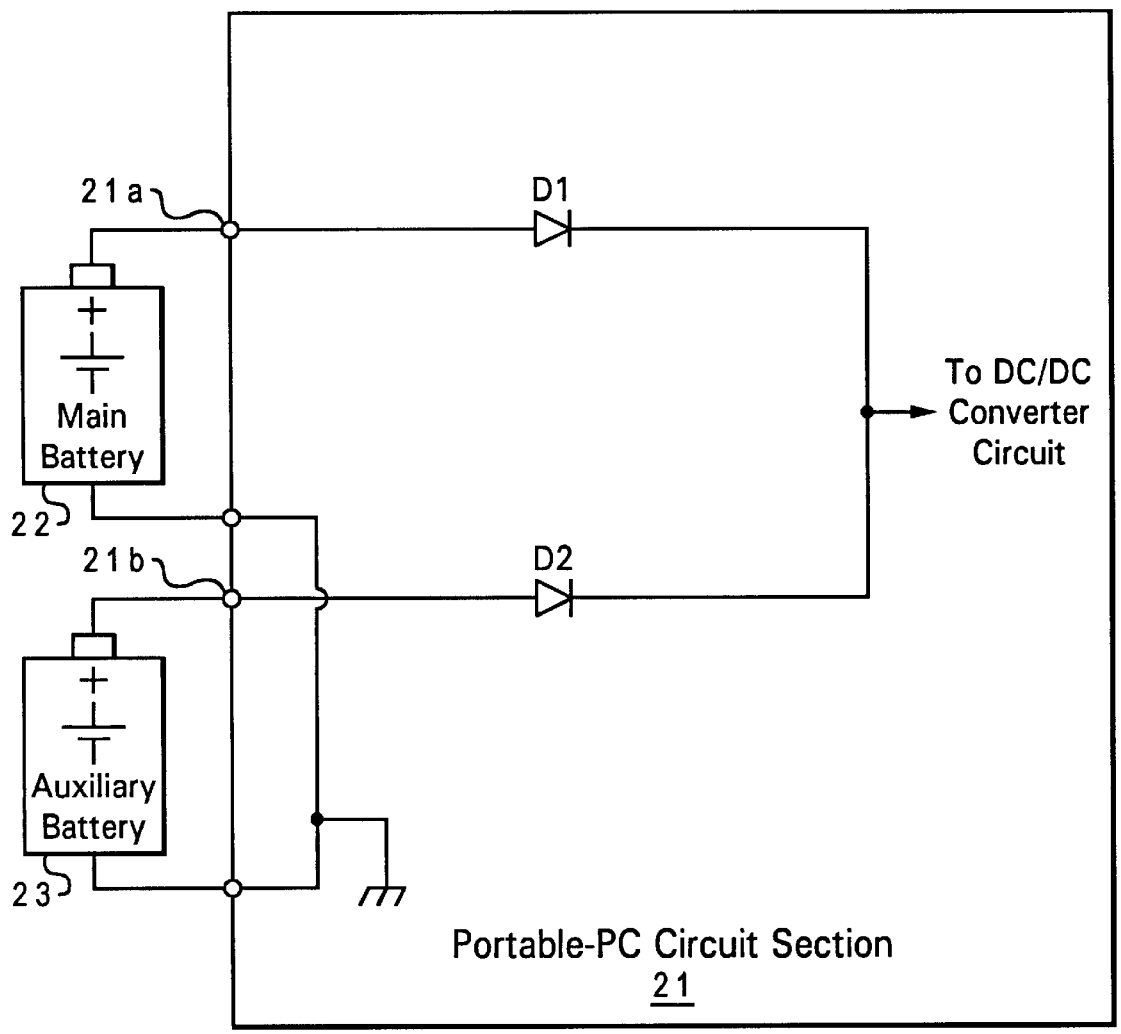
FIG. 2 is a first discharge circuit according to an embodiment of the present invention.

Referring now to the figures and in particular to FIG. 2 there is illustrated a discharge circuit in which one embodiment of the invention may be implemented. A portable-PC circuit section 21 is provided with two terminals 21a and 21b for connecting two batteries. One end of a diode D1 is connected to terminal 21a, and one end of a diode D2 is connected to terminal 21b. The other ends of diodes D1 and D2 are connected to each other and then to a DC/DC converter circuit (not shown).

A main battery 22 and an auxiliary battery 23 are connected to portable-PC circuit section 21 according to the above structure. The positive electrode of the main battery 22 is connected to terminal 21a, and the positive electrode of auxiliary battery 23 is connected to terminal 21b. Negative electrodes of main battery 22 and auxiliary battery 23 are respectively connected to ground (GND).

According to the invention, main battery 22 and auxiliary battery 23 are rechargeable batteries. For example, both batteries may be lithium ion batteries. Moreover, main battery 22 and auxiliary battery 23 can respectively take a form of a battery pack removable from portable-PC circuit section 21. All references herein to a battery refer to a rechargeable battery, unless specifically stated otherwise.

The circuit depicted in FIG. 2 performs parallel discharge. In the preferred embodiment, the portable PC first discharges the main 22 and auxiliary batteries 23 in parallel and then discharges them serially. When parallel discharge is performed, positive electrodes and negative electrodes of the main and auxiliary batteries 22 and 23 are connected to each other. By connecting the electrodes in this manner, current flows into the battery having a low terminal voltage from the battery having a high terminal voltage. To prevent a power loss from occurring due to the current, diodes D1 and D2 are connected to positive electrodes of main and auxiliary batteries 22 and 23.

Figure 3:
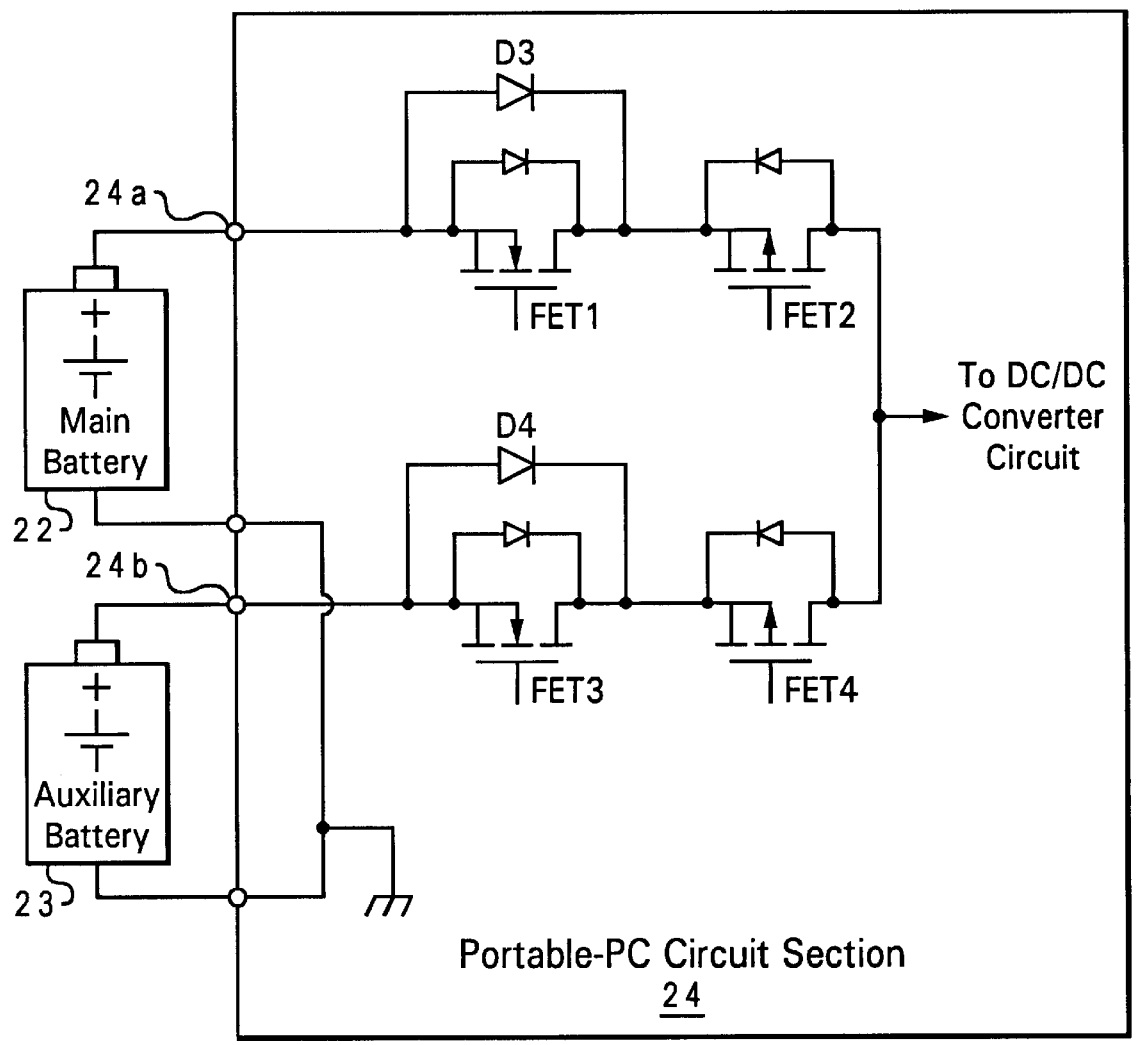
FIG. 3 is a second discharge circuit utilized in an embodiment of the present invention.

FIG. 3 illustrates another circuit in which the above described process maybe completed. In FIG. 3, a portable-PC circuit section 24 is provided with two terminals 24a and 24b for connecting two batteries. Metal Oxide Semiconductor (MOS) field effect transistors FET1 and FET2 are connected in series to terminal 24a. FIG. 3 also illustrates body diodes used in FET1 and FET2. Because a body diode has a large forward voltage ($V_f$)valve, a power loss is produced which cannot be ignored. To decrease the power loss, FET1 is connected in parallel with a Schottky barrier diode D3 having a forward voltage ($V_f$) smaller than that of the body diode in parallel.

Similarly, FET3 and FET4 are connected in series to terminal 24b and a Schottky diode D4 is connected in parallel to FET3. The drains of FET2 and of FET4 are connected to each other and to a DC/DC converter circuit. The positive electrode of main battery 22 is connected to terminal 24a, and the positive electrode of auxiliary battery 23 is connected to terminal 24b. Negative electrodes of main battery 22 and auxiliary battery 23 are both connected to ground (GND).

The term "C" will be frequently utilized in the following description and refers to nominal capacity (rated capacity), or capacity that is available. Thus, 1C denotes a current used to discharge the rated capacity of a rechargeable battery for one hour. For example, discharging a rechargeable battery having a rated capacity of 2,450 mAh at 2,450 mA is referred to as discharging the battery at 1C. Discharge at 0.1 C may be performed at 2,450 mA×0.1=245 mA. C is also refers to a charging current similarly discharging current. In general, the rated capacity of a rechargeable battery is defined as a capacity when the rechargeable battery is charged at a current of 0.5 C and discharged at a current of 0.5 C.

Operations of the discharge circuit shown in FIG. 3 are described below by referring to the flow chart illustrated in FIG. 1.

At the beginning of the process, main battery 22 and auxiliary battery 23 are simultaneously discharged (step 11) (i.e., parallel discharge is performed). In order for parallel discharge to occur, FET2 and FET4 are turned on, and FET1 and FET3 are turned off. Schottky barrier diodes D3 and D4 prevent main battery 22 and auxiliary battery 23 from short-circuiting.

While parallel discharge is being performed, a determination is made whether capacities of main battery 22 and auxiliary battery 23 are respectively kept at (or above) a predetermined value (step 12). This determination is performed by subtracting an accumulated discharge quantity from a fully-charged capacity or simply, measuring a voltage of the battery. When the batteries are at or above the predetermined capacity value, parallel discharge continues. If, however, the batteries are below the predetermined capacity values, discharge of main battery 22 is stopped.

The above predetermined capacity depends on the type of battery cells utilized as main battery 22 and auxiliary battery 23 or a maximum charging current. When the maximum charging current is equal to $x$C (where x is a positive real number), it is preferable to set the predetermined capacity to a capacity when the charging current become, for example, (1/2)$x$C. Thus, the predetermined capacity is kept in a range of 70 and 90% of the rated capacity. The reasons for the selected range are described below.

After stopping discharge of main battery 22 (step 13), only auxiliary battery 23 is discharged (step 14). To complete the change, FET1 and FET2 are turned off, and FET3 and FET4 are turned on. Then, a determination is made whether any capacity remains in auxiliary battery 23 (step 15). If there is some capacity left, discharge of only auxiliary battery 23 continues. If, however, no capacity is left, discharge of the auxiliary battery 23 automatically stops and discharge of main battery 22 is triggered (step 17) by turning on FET1 and FET2 and turning off FET3 and FET4.

Figure 5:
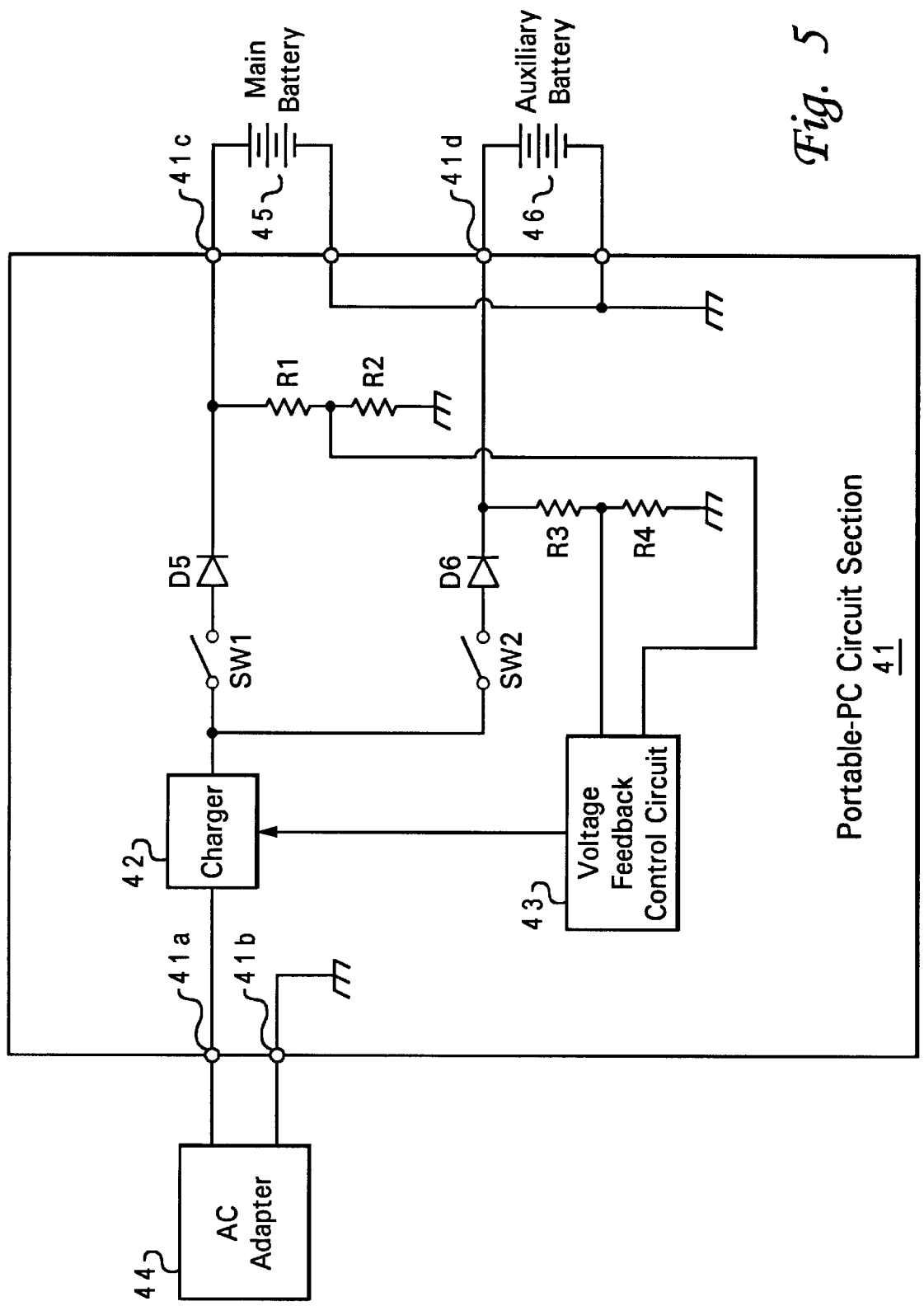
FIG. 5 is a charging circuit utilized in one embodiment of the present invention.

FIG. 5 illustrates a circuit by which charging operations of the invention are implemented. A portable-PC circuit section 41 is provided with a charger 42, a voltage feedback control circuit 43, and terminals 41a, 41b, 41c, and 41d. One end of charger 42 is connected to terminal 41a. The other end of charger 42 is divided into two paths. One of the paths is connected to terminal 41c through a switch SW1 and a diode D5. The other path is connected to terminal 41d through a switch SW2 and a diode D6.

Terminal 41c is connected to a series resistance branch comprising resistors R1 and R2, and terminal 41d is connected to a series resistance comprising resistors R3 and R4. The midpoint between series resistors R1 and R2 and the midpoint between the series resistors R3 and R4 are connected to an input of voltage feedback control circuit 43. An output of voltage feedback control circuit 43 provides the input to charger 42. Terminal 41b is connected to a ground (GND).

Terminal 41c is connected to main battery 45, and terminal 41d is connected with auxiliary battery 46. Both main battery 45 and auxiliary battery 46 are rechargeable batteries, such as lithium ion batteries. Moreover, main battery 45 and auxiliary battery 46 may be a battery pack removable from portable-PC circuit section 41.

When a commercial power supply is available, a user connects an AC adapter 44 to terminals 41 and 41b. Main battery 45 and auxiliary battery 46 are charged by the power supplied from the AC adapter 44. AC adapter 44 provides a capacity that is capable of performing current charging at a rate of 0.7C.

Operations of the charging circuit shown in FIG. 5 will be described using lithium ion batteries as main battery 45 and auxiliary battery 46. The lithium ion battery is normally first charged at a constant current and then at a constant voltage. The current for performing constant-current charge is referred to herein as "CC."

Figure 6:
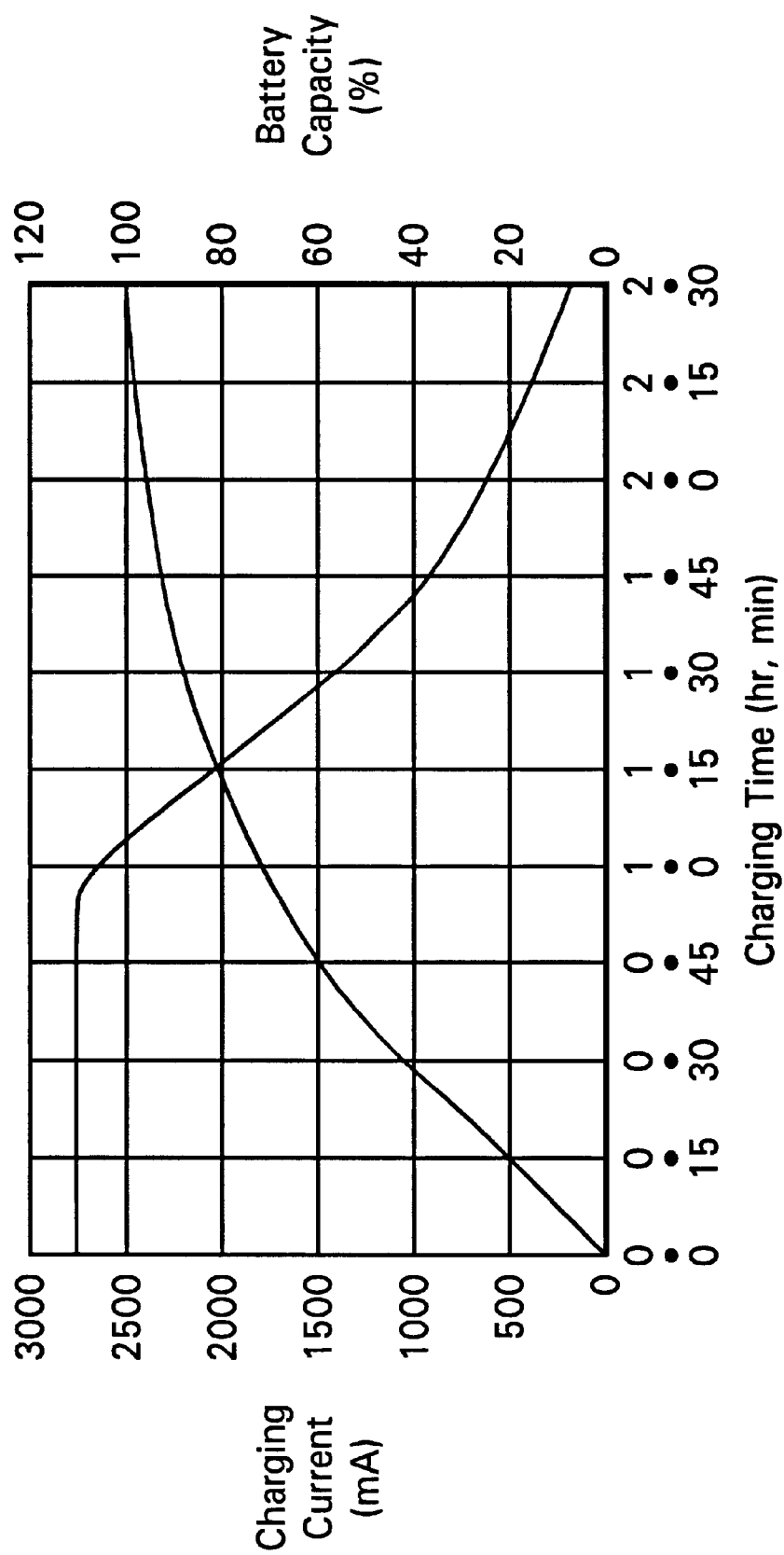
FIG. 6 is a graph depicting charge characteristics of a rechargeable battery used in an embodiment of the present invention.

FIG. 6 shows charging characteristics of a lithium ion battery. Constant-current charge is performed for approximately 50 minutes at a "CC" of 2750 mA. Thereafter, constant-voltage charging is performed. The charging current gradually decreases as time elapses. The battery reaches 100% (i.e., the fully charged state) after 2.5 hours (hr), and charging is completed.

In this embodiment, charging time is decreased by first serial-charging and then parallel-charging main battery 45 and auxiliary battery 46. Changing from serial-charging to parallel-charging occurs when the charging current becomes "CC"/2 (that is, half the current value under constant-current charge). When the changing between charge states occurs (i.e., changing to parallel charge), a charging current may be set to "CC" for both batteries. Therefore, a charger 42 is more efficiently utilized.

It is normally possible to charge a rechargeable battery at a current of 1C. However, a lithium ion battery is frequently charged at approx. 0.7C for safety.

That is, "CC" is equal to 0.7C. Therefore, in the preferred embodiment, "CC"/2 is equal to 0.35C.

Figure 4:
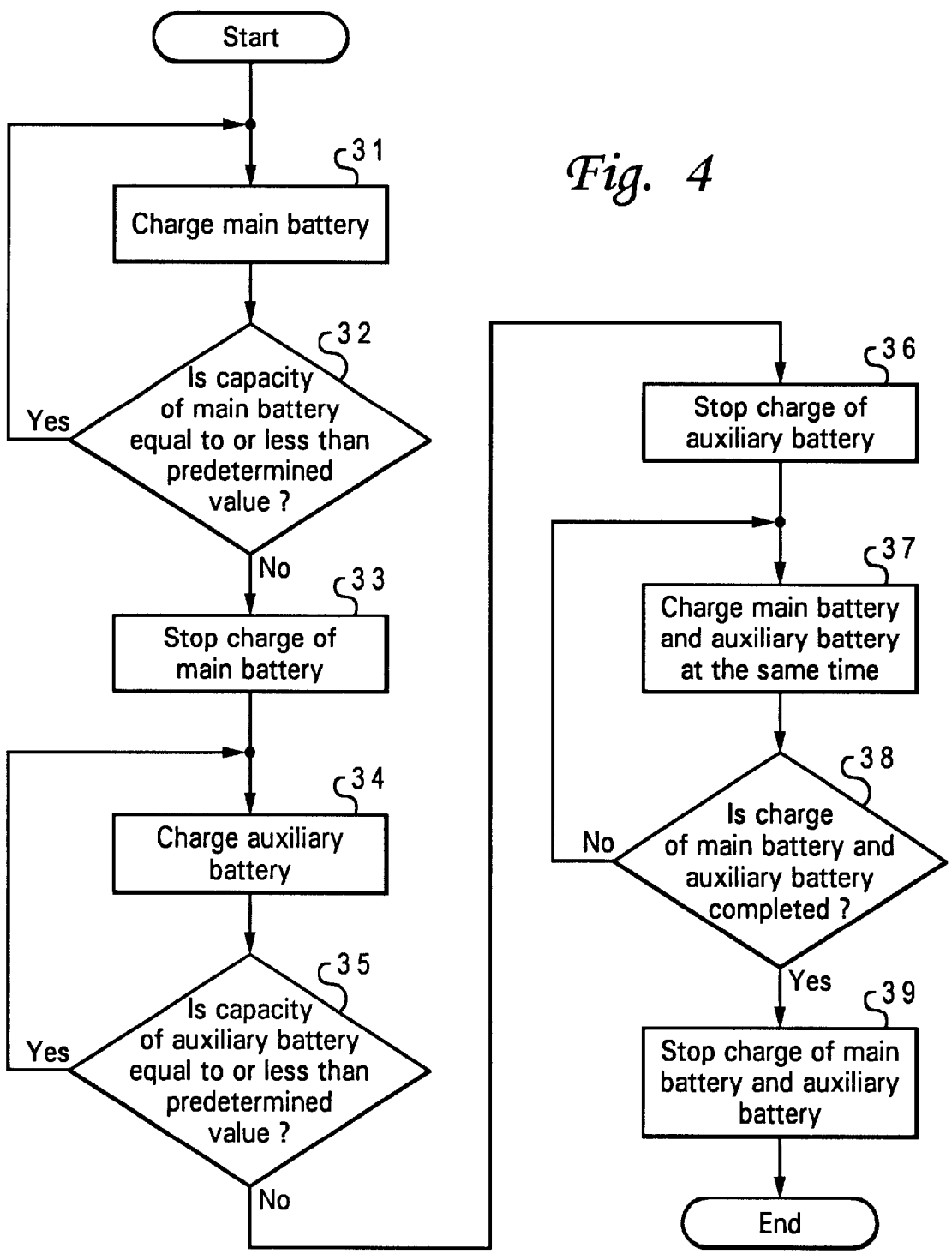
FIG. 4 is a flow chart, which illustrates the process of charging two rechargeable batteries according to an embodiment of the present invention.

Hereafter, operations of the charging circuit shown in FIG. 3 will be described by referring to the flow chart shown in FIG. 4. In the first illustrative embodiment, main battery 45 and auxiliary battery 46 are completely discharged to allow for a comparison with the previous methods within the art. Thereafter, a second illustrative embodiment is provided in which only auxiliary battery 46 is serially-discharged after parallel discharge, but the main battery 45 is not serially-discharged.

In the first illustrative embodiment, main battery 45 and auxiliary battery 46 are initially completely discharged, i.e., depleted of charge. First, main battery 45 is charged by closing switch SW1 (step 31). The charging method uses constant-current charge and constant-voltage charge. "CC" for a current for initial constant-current charge is equal to 0.7C. During charging, a determination is made whether the main battery 45 has been charged to a predetermined value (e.g., "CC"/2= 0.35) (step 32). When the charge is less than or equal to the predetermined value, charging of main battery 45 continues. If, however, the charge is greater than the predetermined value, switch SW1 is opened, and charging of main battery 45 stops.

Thereafter, switch SW2 is closed to charge auxiliary battery 46 (step 34). The charging method uses constant-current charge and constant-voltage charge as described above for battery 45. In this embodiment CC for initial constant-current is also equal to 0.7C. During charging, a determination is made whether the charge of auxiliary battery 46 is equal to or less than a value corresponding to, for example, "CC"/2=0.35 (step 35). When the capacity is equal to or less than the value, charging of auxiliary battery 46 continues. If, however, the charge is greater than the value, switch SW2 is opened, and charging of auxiliary battery 46 stops.

Switches SW1 and SW2 are then closed to charge the main battery 45 and auxiliary battery 46 at the same time (step 37). Two diodes D5 and D6 prevent the main battery 45 and auxiliary battery 46 from short-circuiting. Voltages obtained by dividing a voltage of main battery 45 with series resistors R1 and R2 are input to voltage feedback control circuit 43. Voltages obtained by dividing a voltage of auxiliary battery 46 with series resistors R3 and R4 are also input to voltage feedback control circuit 43. While main battery 45 and auxiliary battery 46 are charged at the same time (parallel charge), voltages of both batteries are not always kept at the same value. As a result, during checking, charger 42 charges either of main battery 45 or auxiliary battery 46 that has a lower voltage. Therefore, it is necessary to feed back the voltage of main battery 45 and auxiliary battery 46 being currently charged to charger 42. The feedback is provided by voltage feedback control circuit 43.

During the above charging, a determination is made whether or not charging of main battery 45 and auxiliary battery 46 is complete (step 38). If not simultaneous charging of main battery 45 and auxiliary battery 46 (i.e., parallel charging) continues. If, however, charging is complete, charging of main battery 45 and auxiliary battery 46 is stopped.

The effects of this embodiment are verified by referring to the graph of FIG. 6, which illustrates charging characteristics. First, a time for serially charging main battery 45 and auxiliary battery 46 is calculated. From FIG. 6, it is shown that the time for charging one battery is equal to 2.5 hr. Therefore, the time for charging main battery 45 and auxiliary battery 46 is equal to 2.5 hr.×2=5 hr.

According to FIG. 6, "CC" is equal to 0.7 C or 2,750 mA. Therefore, "CC"/2 is equal to 0.35 C, which is equal to 1,375 mA. The charging current becomes "CC"/2 at 1.5 hr after charging begins. Therefore, the time for serial-charging main battery 45 and auxiliary battery 46 is equal to 1.5 hr×2=3 hr. Moreover, the time for parallel-charging main battery 45 and auxiliary battery 46 is equal to 2.5 hr−1.5 hr=1 hr. Therefore, a time for charging the main battery 45 and auxiliary battery 46 is equal to 3 hr+1 hr=4 hr. That is, according to this embodiment, it is possible to decrease the charging time by 5 hr−4 hr=1 hr as compared with the prior art methods.

The second embodiment describes when main battery 45 is parallel-discharged but is not serially-discharged. When self-discharge of the battery 45 is ignored, charging is started with the charging of only auxiliary battery 46 in step 34 of FIG. 4. Because subsequent operations are the same as the case described above, description thereof is omitted.

Effects of the second embodiment in the above case are verified below by referring to FIG. 6, which illustrates charging characteristics. According to FIG. 6, "CC" is equal to 0.7C or 2,750 mA. Therefore, "CC"/2 is equal to 0.35 C, which is equal to 1,375 mA. The charging current becomes "CC"/2 at 1.5 hr after charging is started. Therefore, it takes 1.5 hr to charge auxiliary battery 46. Moreover, it takes 2.5 hr−1.5 hr =1 hr to parallel-charge main battery 45 and auxiliary battery 46. Therefore, it takes 1.5 hr+1 hr=2.5 hr to charge main battery 45 and auxiliary battery 46.

As described above, parallel discharge of main battery 22 and auxiliary battery 23 ends when the capacities of both batteries respectively reach a predetermined value. Moreover, when a maximum charging current is equal to xC (where x is a positive real number), it is preferable to set the above predetermined capacity to a value at which the charging current becomes approximately (½)xC. By utilizing the above setting, the predetermined capacity is kept in a range of 70 to 90% of the rated capacity.

Thus, in the preferred embodiment, xC is equal to "CC," which is equal to 0.7C, and (½)xC is equal to "CC"/2, which is equal to 0.35 C. When applying the above expression to FIG. 6, a charging current becomes (½)xC ="CC"/2=0.35 C at 1.5 hr after charging starts and the battery capacity is approximately 85%. Therefore, in the discharging circuit embodiment illustrated in FIG. 3, parallel discharge of the main battery 22 and auxiliary battery 23 ends when the capacities of both batteries respectively become 85%. In other words, parallel discharge of main battery 22 and auxiliary battery 23 ends when both batteries discharge 15% of their respective capacities.

The above examples describe application of the present invention to control charge and discharge of a plurality of batteries when applied to a portable PC powered by two batteries. However, the present invention is not restricted to the above examples. The invention may be applied to an electronic device having three batteries or more. For example, when n (where n is an integer equal to or greater than 3) batteries are used, a maximum charging current (1/n)xC becomes equal to "CC"/n. Here, "CC" denotes a current for performing constant-current discharge, and x denotes a positive real number.

The described embodiment for controlling charge and discharge of a plurality of batteries may be implemented and/or controlled by a program (hereafter referred to as "charge-discharge control program") created with one of various programming languages. The charge-discharge control program may be recorded in a computer-readable recording medium. The recording medium may use a memory to be mounted on a computer system such as a ROM (Read Only Memory), EEPROM (Electrically Erasable Programmable Read Only Memory), or flash EE ROM, a portable recording medium such as a floppy disk (FD), CD-ROM (Read Only Memory Using a Compact Disk), or MO (Magneto-Optical) disk or a external memory provided for a server computer connected to a network.

A charge-discharge control program recorded in a recording medium is captured into an electronic device as described below. When a recording medium of this embodiment storing a charge-discharge control program comprises a portable recording medium, the portable recording medium is set to a drive and a charge-discharge control program stored in the portable recording medium is read from the portable recording medium. The read charge-discharge control program is stored in a main memory.

When the recording medium uses an external memory on a network, a charge-discharge control program is downloaded from the external memory through a network connector. The down-loaded charge-discharge control program is stored in a main memory.

Figure 7:
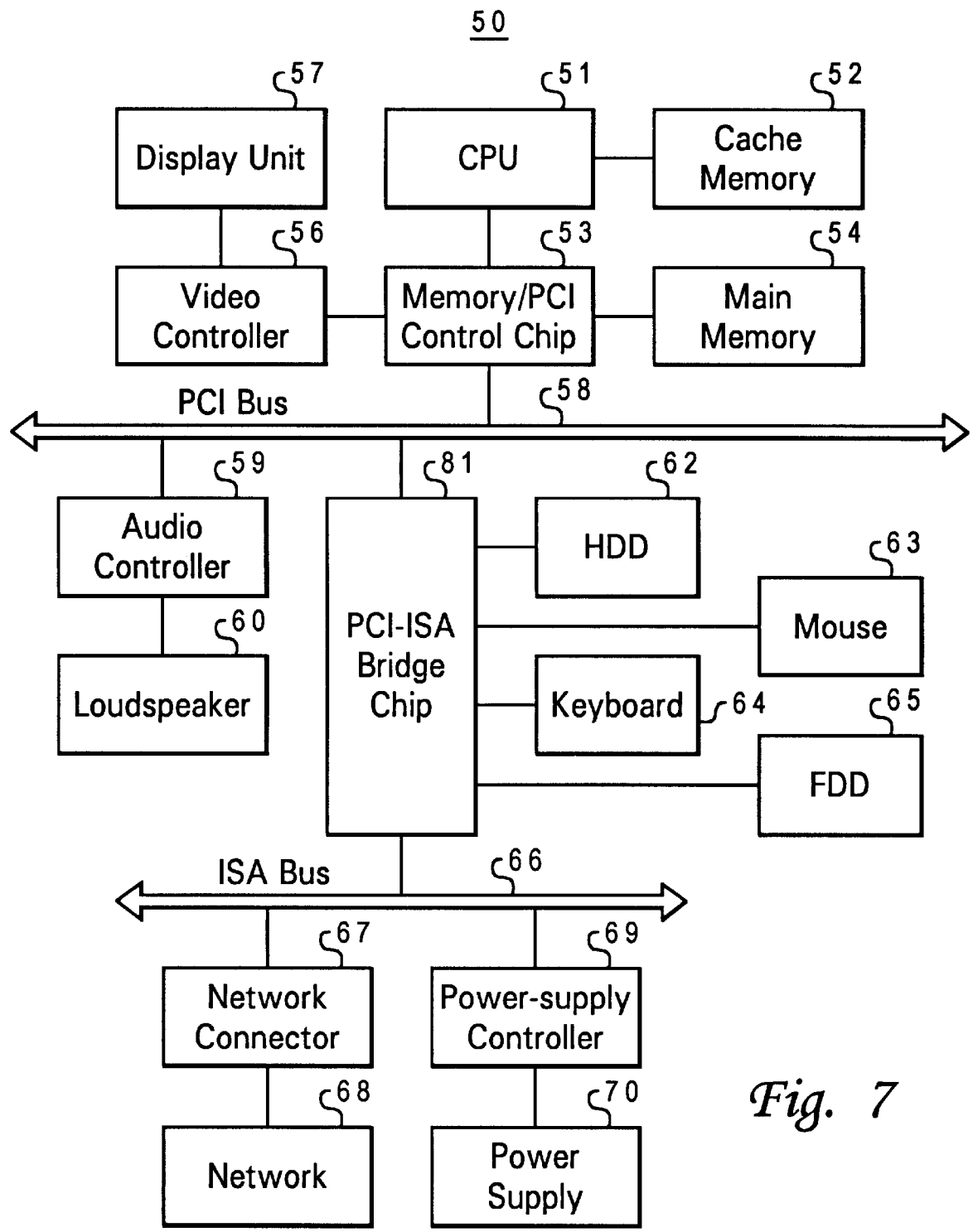
FIG. 7 is a block diagram illustrating an electronic device used to execute a charge-discharge control program according to an embodiment of the present invention.

An electronic device used to execute the charge-discharge control program of this embodiment is described below by referring to FIG. 7. The electronic device can be any electronic device as long as it uses a plurality of rechargeable batteries. In this case, description is made by assuming that a computer 50 is used as the electronic device. Computer 50 is configured with CPU 51, cache memory 52, memory/PCI control chip 53, main memory 54, AGP port 55, video controller 56, display unit 57, PCI bus 58, audio controller 59, loudspeaker 60, PCI-ISA bridge chip 61, hard disk drive (HDD) 62, mouse 63, keyboard 64, floppy disk drive (FDD) 65, ISA bus 66, network connector 67, network 68, power-supply controller 69, and power supply 70. FIG. 7 shows only main components. The computer 50 may be configured with many components in addition to these main components. Moreover, a system excluding some of the main components may be present depending on the configuration. CPU (Central Processing Unit) 51 may be one of the x86-series microprocessors made by Intel Corporation and the PowerPC processor, PowerPC is a trademark of IBM (International Business Machines) Corporation and Motorola Inc.

Cache memory 52 is a memory for temporarily storing the data to be read or written by CPU 51 in order to accelerate data transfer between CPU 51 and the main memory 54. The memory 52 may be a SRAM (Static Random Access Memory), which is faster than main memory 54.

The memory/PCI control chip 53 is an LSI (Large Scale Integrated circuit) for connecting CPU 51 and the main memory 54 with PCI bus 58. Memory/PCI control chip 53 is generally referred to as "north bridge." Memory/PCI control chip 53 is provided with a CPU bus interface, main memory interface, PCI bus interface, and AGP port interface. Main memory 54 is a memory comprising a DRAM (Dynamic Random Access Memory) to be directly read or written by CPU 52 and for an operating system (OS) or an application program to store a program or data.

The AGP (Accelerated Graphics Port) 55 is a port standard dedicated to graphics proposed by Intel Corporation. Graphics drawing is accelerated by directly connecting main memory 54 and video controller 56 without passing through PCI bus 58.

Video (or graphics) controller 56 controls indications on the display unit 57. Display unit 57 is an output unit for displaying results processed in computer 50 with characters and graphics on a screen. Display unit 57 can be implemented with a CRT display unit or a liquid crystal display or the like. Audio controller 59 drives loudspeaker 60 to generate sound in accordance with audio data generated by computer 50 or received from an external unit.

PCI bus 58 is a standard high-speed bus of a personal computer (PC). PCI (Peripheral Component Interconnect) is a local bus architecture defined by PCI Special Interest Group.

PCI-ISA bridge chip 61, which is generally referred to as a "south bridge," is originally an LSI (semiconductor chip) for connecting PCI bus 58 with ISA bus 66. ISA (Industry Standard Architecture) is an international bus standard based on an extension bus used in the IBM PC/AT personal computer. Because of advancement of high-integration arts, PCI-ISA bridge chip 61 has been provided with various functions. For example, PIIX4E of Intel Corp. includes an IDE controller, mouse/keyboard controller, FDD (floppy disk drive) controller, and USB controller.

IDE (Integrated Device Electronics) is one of interfaces of a hard disk drive. Standardization of interfaces was first proposed by a group of hard-disk drive manufacturers, and thereafter ANSI (American National Standards Institute) standardized interfaces as ATA (AT Attachment). Thereafter, a specification for connecting a CD-ROM drive to an IDE interface was deformed as ATAPI (AT Attachment Packet Interface). A hard-disk drive (HDD) and a CD-ROM drive used by a personal computer (PC) are normally connected by IDE.

USB (Universal Serial Bus) is a bus standard for a personal computer (PC) jointly developed by seven companies such as Intel Corp., Microsoft Corporation, Compaq Computer Corp., DEC Corp. (Digital Equipment Corporation), IBM Corp., Northern Telecom, and NEC Corp. USB is a serial bus that is used to connect comparatively-low-speed peripheral units.

Hard-disk drive (HDD) 62 is a unit for reading or writing data from or in a hard disk rotating at a high speed by a magnetic head. Mouse 63 is a typical pointing device (device for designating a position on a screen) of a personal computer (PC). Keyboard 64 is a standard input unit used to input characters to a computer. Floppy-disk drive (FDD) 65 is a unit for reading or writing data from or in a floppy disk.

ISA bus 66 is a bus for an extended slot for an IBM PC/AT compatible unit, which is used for a comparatively-low-speed purpose. Network connector 67 is, for example, NIC. A NIC (Network Interface Card) is an interface card used to connect computer 50 Network 68. Network 68 is, for example, a LAN, a WAN (Wide Area Network), or the Internet.

Power supply controller 69 is a unit for controlling power supply 70. Power supply 70 is, for example, a primary battery, rechargeable battery, or AC adapter.

The invention provides several advantages stemming from the fact that parallel discharge of the rechargeable batteries is automatically performed at the beginning of discharge. Thus, all the rechargeable batteries each have a vacant capacity at the start of charging, and parallel charging of the rechargeable batteries are realized by these vacant capacities. A chief benefit of the invention is that a plurality of batteries may be efficiently charged in a short time.

While the invention has been particularly shown and described with reference to a preferred embodiment, it will be understood by those skilled in the art that various changes in form and detail may be made therein without departing from the spirit and scope of the invention.

What is claimed is:

1. A method of controlling charge and discharge of two or more rechargeable batteries, said method comprising the steps of:

concurrently discharging a first battery and a second battery to a predetermined percentage of total capacity of each battery;

in response to a charge of said first battery reaching said predetermined percentage of total capacity, stopping a discharging of said first battery, while continuing to discharge said second battery; and responsive to said second battery being completely discharged, automatically resuming said discharging of said first battery.

2. The method of claim 1, further comprising the steps of:

in response to a detection of a connection to an external power supply, serially charging said first battery and then said second battery to respective predetermined serial charging percentages of total capacity; and in response to said second battery being charged to its predetermined serial-charging percentage of total capacity, initiating concurrent charging of said first and second battery to a charge value above said predetermined serial charging percentages.

3. The method of claim 2, further comprising calculating said predetermined percentages and said predetermined serial charging percentages based on a charging current equal to half of a nominal capacity of said first and second batteries, respectively.

4. The method of claim 3, wherein:

said serial charging step includes charging each of said first and second batteries at a constant current that is associated with a maximum capacity of respective ones of said first and second batteries; and said initiating step includes charging said first and second batteries at a constant voltage once said pre-determined serial charging percentages are reached.

5. The method of claim 4, further comprising:

gradually decreasing a charging current over time while said batteries are being charged at said constant voltage; and switching from a serial charging of said batteries to a parallel charging when a value of said charging current reaches one-half of said constant current value.

6. The method of claim 5, wherein said two or more rechargeable batteries are lithium ion batteries and the value utilized for said constant current is equal to 70% of the maximum constant current possible with said nominal capacity.

7. A system for controlling charge and discharge of two or more rechargeable batteries, comprising:

means for concurrently discharging a first battery and a second battery in parallel to a predetermined percentage of total capacity of each battery;

means, responsive to a charge of said first battery reaching a pre-determined percentage of total capacity, for stopping a discharging of said first battery, while continuing to discharge said second battery; and means, responsive to said second battery being completely discharged, for automatically resuming said discharging of said first battery.

8. The system of claim 7, further comprising:

means, responsive to a detection of a connection to an external power supply, serially charging said first battery and then said second battery to respective predetermined serial charging percentages of total capacity; and means, responsive to said second battery being charged to its predetermined serial-charging percentage of total capacity, initiating concurrent charging of said first and second battery to a charge value above said predetermined serial charging percentages.

9. The system of claim 8, further comprising means for calculating said predetermined percentages and said predetermined serial charging percentages based on a charging current equal to half of a nominal capacity of said first and second batteries, respectively.

10. The system of claim 9, wherein:
said serial charging means includes means for charging each of said first and second batteries at a constant current that is associated with a maximum capacity of respective ones of said first and second batteries; and
said initiating means includes means for charging said first and second batteries at a constant voltage once said pre-determined serial charging percentages are reached.

11. The system of claim 10, further comprising:
means for gradually decreasing a charging current over time while said batteries are being charged at said constant voltage; and
means for switching from a serial charging of said batteries to a parallel charging when a value of said charging current reaches one-half of said constant current value.

12. The system of claim 11, wherein said two or more rechargeable batteries are lithium ion batteries and the value utilized for said constant current is equal to 70% of the maximum constant current possible with said nominal capacity.

13. A computer program product for controlling operation of a charge and discharge circuit for two or more rechargeable batteries, said program product comprising:
a computer readable medium;
program instructions provided via said computer readable medium for:
concurrently discharging a first battery and a second battery to a predetermined percentage of total capacity of each battery;
in response to a charge of said first battery reaching said predetermined percentage of total capacity, stopping a discharging of said first battery, while continuing to discharge said second battery; and
responsive to said second battery being completely discharged, automatically resuming said discharging of said first battery.

14. The computer program product of claim 13, further comprising program instructions for:
in response to a detection of a connection to an external power supply, serially charging said first battery and then said second battery to respective predetermined serial charging percentages of total capacity; and
in response to said second battery being charged to its predetermined serial-charging percentage of total capacity, initiating concurrent charging of said first and second battery to a charge a value above said predetermined serial charging percentages.

15. The computer program product of claim 14, further comprising program instructions for calculating said predetermined percentages and said predetermined serial charging percentages based on a charging current equal to half of a nominal capacity of said first and second batteries, respectively.

16. The computer program product of claim 15, wherein:
said serial charging program instructions includes instructions for charging each of said first and second batteries at a constant current that is associated with a maximum capacity of respective ones of said first and second batteries; and
said initiating program instructions includes instructions for charging said first and second batteries at a constant voltage once said pre-determined serial charging percentages are reached.

17. The computer program product of claim 16, further comprising program instructions for:
gradually decreasing a charging current over time while said batteries are being charged at said constant voltage; and
switching from a serial charging of said batteries to a parallel charging when a value of said charging current reaches one-half of said constant current value.

18. An electronic circuit comprising:
a plurality of battery terminal pairs including a pair for a first battery and a pair for a second battery, wherein each battery terminal pair includes a high voltage positive terminal and a negative terminal biased at substantially zero voltage; and
means for controlling a discharge of said first and second batteries, wherein: p2 said first and second batteries are discharged in parallel when their respective charges are above a predetermined percentage of their associated capacity; and
said second battery is discharged serially before said first battery when a charge of said second battery falls to said predetermined percentage.

19. The electronic circuit of claim 18, wherein said means for controlling includes:
a first pair of transistors coupled in series between a positive terminal of said first battery and a DC/DC converter circuit, wherein said transistors include first internal switching elements;
a first switching element coupled to a first one of said transistors, which is directly coupled to said first battery, wherein said first switching element is coupled in parallel with a corresponding internal switching element of said first one of said transistors and carries a forward voltage, which is smaller than a forward voltage of said corresponding internal switching element;
a second pair of transistors coupled in series between a positive terminal of said second battery and said DC/DC converter circuit, wherein said transistors include second internal switching elements; and
a second switching element coupled to a first one of said second pair of transistors that is directly coupled to said second battery, wherein said first switching element is coupled in parallel with a second corresponding internal switching element of said first one of said second pair of transistors and carries a forward voltage, which is smaller than a forward voltage of said second corresponding internal switching element.

20. The electronic circuit of claim 19 wherein said first switching element and said second switching element are Schottky barrier diodes.

21. The electronic circuit of claim 18, wherein said means for controlling includes a data processing system coupled to said circuit which directs said discharging functions.

22. An electronic circuit, comprising:
a plurality of battery terminal pairs including a pair for a first battery and a pair for a second battery, wherein each battery terminal pair includes a high voltage positive terminal and a negative terminal biased at substantially zero voltage;
an AC adapter biased at one terminal at substantially zero voltage; and means for efficiently charging said first battery and said second battery using an alternating current source connected to said AC adapter, said means serially charging said first battery followed by said second battery, wherein said first battery and said second battery are charged to respective predetermined serial charging percentages of total capacity and, in response to a charge of said second battery reaching said predetermined serial charging percentage, charging said first and second battery concurrently.

23. The electronic circuit in claim 22 wherein said means for efficiently charging includes:
   a charger respectively coupled to said AC adapter and to said positive terminals of said first and said second batteries via connectors, which comprise a switch and a diode;
   a first and second pair of series connected resistors with a first end coupled to ground and a second end coupled to said connectors, respectively, between said diode and said positive terminal; and
   a voltage feedback control circuit, which is connected between a first and second resistor of both of said first and second pair of series connected resistors, said voltage feedback control circuit being further coupled to said charger and controls the charging of said plurality batteries connected to said plurality of battery terminal pairs by serially charging said first battery then said second battery up to a predetermined capacity, and then parallel-charging both batteries.

24. The electronic circuit of claim 22, further comprising a data processing system coupled to said voltage feedback control circuit by which said charging functions are directed.

25. A method of controlling charge and discharge of a plurality of rechargeable batteries having the same capacity, in which a maximum charging current is equal to xC, where x is a positive real number, said method comprising the steps of:
   performing parallel discharge of the plurality of rechargeable batteries and stopping the parallel discharge when a current for charging each rechargeable battery substantially becomes $(½)xC$;
   responsive to said current becoming substantially $(½)xC$, performing serial discharge of the plurality of rechargeable batteries by discharging the plurality of rechargeable batteries one by one until a remaining charge of each rechargeable battery reaches a predetermined value;
   responsive to a detection of a power source, serially charging the rechargeable batteries one by one through constant-current charge, wherein said serially charging is performed until a current associated with a charge of each of said plurality of rechargeable battery substantially becomes $(½)xC$; and
   responsive to said current becoming $(½)xC$ during charging, performing parallel charging of the rechargeable batteries with constant-voltage.

26. The method of claim 25, wherein said plurality of rechargeable batteries include a main battery and an auxiliary battery, said method further comprising the steps of:
   discharging the main battery when a remaining capacity of the auxiliary battery becomes substantially equal to zero;
   charging the main battery through constant-current charge and constant-voltage charge, whereon the main battery is charged until a current for charging the main battery substantially becomes $(½)xC$;
   charging the auxiliary battery through constant-current charge and constant-voltage charge, whereon the auxiliary battery is charged until a value of a current for charging the auxiliary battery substantially becomes $(½)xC$; and
   responsive to the charging current for both the main battery and auxiliary battery reaching $(½)xC$, performing parallel charging of the main battery and the auxiliary battery and continuing said parallel charging until each battery is fully charged.

* * * * *